June 2, 1970  R. C. NICKOLS, JR  3,515,593
FUEL CELL WITH ELECTRICALLY CONDUCTIVE BONDING MEANS
Filed Feb. 19, 1968
FIG. 1
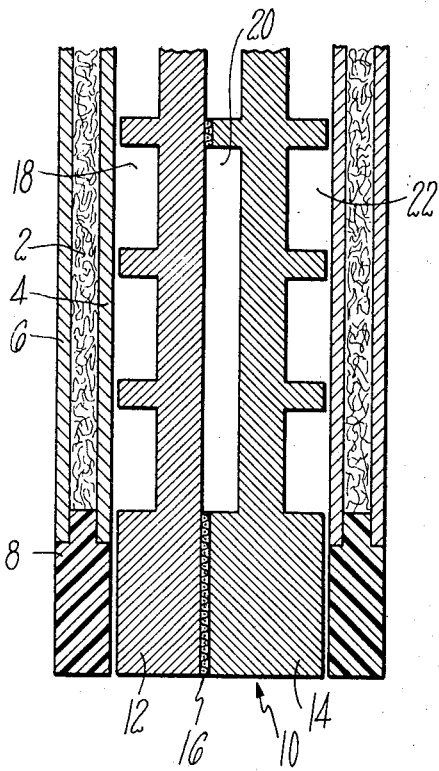
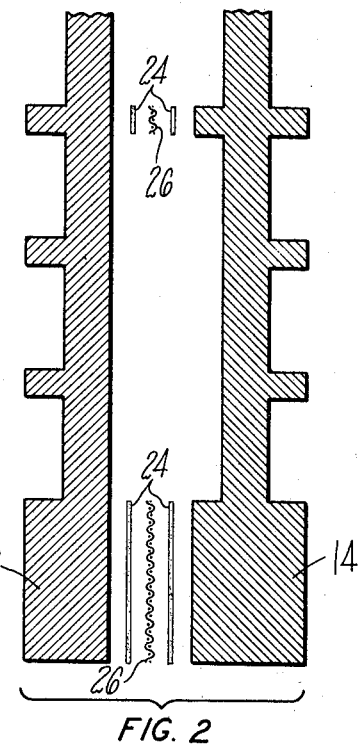
FIG. 2
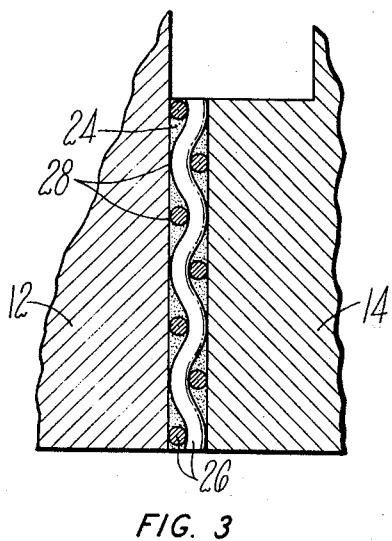
FIG. 3
INVENTOR
RICHARD C. NICKOLS JR.
BY *Charles A. Warren*
ATTORNEY

United States Patent Office 3,515,593
Patented June 2, 1970

3,515,593
FUEL CELL WITH ELECTRICALLY CONDUCTIVE BONDING MEANS
Richard C. Nickols, Jr., Wapping, Conn., assignor to United Aircraft Corporation, East Hartford, Conn., a corporation of Delaware
Filed Feb. 19, 1968, Ser. No. 706,563
Int. Cl. H01m 27/02
U.S. Cl. 136—86                                    12 Claims

ABSTRACT OF THE DISCLOSURE

A lamination bond for use in joining support plates in a fuel cell module wherein conductive structures are joined by a dielectric binder containing a metal screen wherein the metal screen serves to conduct electricity through the bond.

BACKGROUND OF THE INVENTION

This invention pertains to a fuel cell assembly and more particularly to an improvement in conductive bonding means.

In producing a fuel cell module of the type shown in the Gelting Pat. 3,436,272, it is generally desirable to assemble a plurality of cells in series to produce the required electrical power. The complexity and durability of such powerplants can be optimized by internally connecting each cell in series. In this fashion, the problems associated with external leads and connectors are eliminated.

In the present module, fuel cell heat is removed by ducting a liquid coolant through the back-up plate between adjacent cells. The fabrication of hollow back-up plates required that two halves be constructed and bonded together to form a single laminated back-up plate. Previous coolant plate assemblies were unitized using a low melting lead-tin solder. The earlier unitizing approach, although conductive, proved to be expensive, since masking was required in electroplating the solder on mating surfaces prior to joining. Further, the earlier unitizing technique offered only a marginal joint due to the susceptibility of the solder to corrosive attack by the fuel cell electrolyte.

The present invention relates to a novel bonding means in the form of a conductive metallic screen imbedded in a dielectric binder. In addition to securing the back-up plate halves together, this invention provides for the aforementioned electrical conductivity, facilitates assembly of the back-up plate with its coolant passages, and is compatible with the fuel cell electrolyte.

SUMMARY OF THE INVENTION

One feature of this invention is, therefore, a novel electrically conductive bonding means for joining conductive structures.

Another feature of this invention is an electrically conductive bonding means, suitable for fuel cell powerplants, where mating structures can be rigidly secured together, in sealed fashion, to define coolant passages.

BRIEF DESCRIPTION OF THE DRAWINGS

Other features and advantages will be apparent from the specification and claims, and from the accompanying drawings which illustrate an embodiment of the invention.

FIG. 1 is a sectional view through a portion of a fuel cell module.

FIG. 2 is sectional view of the back-up plate halves, binder strips and conductive metallic screen prior to assembly.

FIG. 3 is an exaggerated view of the laminated bond after assembly.

DESCRIPTION OF THE PREFERRED EMBODIMENT

Referring to FIG. 1, the low temperature base fuel cell as shown consists of an asbestos matrix 2 which is preferably soaked in an electrolyte which may be a low concentration of aqueous potassium hydroxide. The matrix is sandwiched between two catalyzed nickel electrodes designated as anode 4 and cathode 6. The matrix and electrodes are securely supported in frame 8. The base fuel cell, as described, is not an essential part of the present invention since the present invention is not limited to use in a low temperature base fuel cell.

A back-up plate 10, composed of a left half 12, a right half 14 and a lamination bond 16, is located between each fuel cell and is used as the current collector, as a gas housing for the fuel and process air and as a liquid coolant ducting and containment means. After assembly, the back-up plate, in conjunction with the adjacent fuel cells, defines fuel gas passages 18, liquid coolant passages 20 within the back-up plate, and process air passages 22.

While the back-up plate 10 serves as a gas housing for fuel and air and as a device for ducting coolant flow, it also performs the function of connecting each fuel cell, electrically, in series, so that the entire fuel cell module is capable of generating the required electrical output. During operation, electrons flow from the cathode 6 through the matrix 2 to the anode 4. Then, the electrons flow to the anode of the next fuel cell. Thus, a series connection between fuel cells is facilitated by use of a conductive back-up plate. Since this module is cooled by a liquid, such as glycol, the back-up plate must be constructed in halves and assembled thereafter to provide the coolant passages. The back-up plate halves must be connected electrically. This invention teaches an electrically conductive bonding concept described herein as lamination bond 16.

Referring to FIG. 2, suitable dielectric binder strips 24, sandwich a metallic conductive screen 26 in stacked relation. This sandwich is properly aligned between the back-up plate halves 12 and 14, to assure proper bonding and electrical conductivity at the mating surfaces around the periphery of the back-up plate. Gaps in the sandwich are provided in the periphery of the back-up plate to permit the inflow and outflow of coolant. Even though the primary function of the sandwich is to form a lamination bond at the periphery of the back-up plate, it can be used to define coolant flow passages by bonding mating surfaces 24 within the back-up plate. Once the entire assembly is properly aligned, it is molded together at 375° F. and at a pressure of 60 pounds per square inch to form a lamination bond.

The temperatures and pressures given are for Union Carbide's resin binder identified as PAHJ Phenoxy Resin which is commercially available in sheet form.

It is apparent that other dielectric binders such as epoxy resins may be used.

The resulting structure forms a unitized back-up plate assembly as shown in FIG. 1. From this figure, it can be seen that lamination bond, which holds the back-up plates securely together, is relatively thin and is effective in joining a back-up plate assembly where the entire assembly thickness may be about 0.190 inch and the lamination bond thus is about 0.006 inch.

FIG. 3 is an exaggerated view of a lamination bond between two conductive structures such as back-up plate halves 12 and 14. The dielectric binder strips 24 have been molded around fibers 28 of the conductive metallic screen. It is sufficient to state that the dielectric binder fills the voids in the screen to form a complete and sealed bond between the structures. The screen has external contours 28 which are pressed snugly against back-up plate halves 12 and 14 in electrically conducting fashion.

It has been found that a 100 mesh nickel screen is particularly suitable for this conductive bond. It is to be understood that a woven screen is suitable for this invention, and that substitutes for a screen may be available to perform the same function without departing from the scope and teaching of the present invention.

What is claimed is:

1. In a fuel cell module including at least two cells each having a pair of electrodes and an electrolyte therebetween, and an electrically conductive back-up plate located between electrodes of adjacent cells and defining fuel and oxidant chambers against the electrodes, the improvement wherein said back-up plate includes a left member and a right member defining at least one coolant passage therebetween and a lamination bond at the mating surface of said members, wherein the lamination bond comprises a metallic screen contained in a dielectric binder, the metallic screen having external contours exposed on opposite sides of the dielectric binder to establish electrical contact between the left member and the right member of the back-up plate.

2. A lamination bond as in claim 1 wherein, the metallic screen contained in the dielectric binder is nickel.

3. A lamination bond as in claim 1 wherein, the dielectric binder is an epoxy resin.

4. A lamination bond as in claim 1 wherein, the dielectric binder is a phenoxy resin.

5. A lamination bond as in claim 1, wherein the metallic screen is nickel and the dielectric binder is a phenoxy resin.

6. In a fuel cell assembly, including a matrix for electrolyte having a peripheral frame and an electrode on each side of the matrix and supported by the peripheral frame, a laminated electrically conductive back-up plate having a left half, a right half and a lamination bond at the mating surfaces, the laminated back-up plate defining passages for coolant flow, the improvement in the lamination bond comprising a metallic screen contained in a dielectric binder, the metallic screen having external contours exposed to the left and right halves of the back-up plate to establish electrical contact.

7. A lamination bond as in claim 6, wherein the metallic screen is nickel.

8. A lamination bond as in claim 6, wherein the dielectric binder is an epoxy resin.

9. A lamination bond as in claim 6, wherein the dielectric binder is a phenoxy resin.

10. A lamination bond as in claim 6, wherein the metallic screen is nickel and the dielectric binder is a phenoxy resin.

11. A lamination bond as in claim 6, wherein the metallic screen is nickel and the dielectric binder is an epoxy resin.

12. In a fuel cell assembly, including a matrix for electrolyte and an electrode disposed on each side of the matrix, a laminated electrically conductive back-up plate having a left member, a right member and a lamination bond at the mating surfaces, the laminated back-up plate defining passages for coolant flow, the improvement in the lamination bond comprising a metallic screen contained in a dielectric binder, the metallic screen having external contours exposed to the left and right members of the back-up plate to establish electrical contact.

References Cited
UNITED STATES PATENTS

| | | | |
|---|---|---|---|
| 3,126,302 | 3/1964 | Drushella | 136—86 |
| 3,394,032 | 7/1968 | Danner | 136—86 |
| 3,411,951 | 11/1968 | Gelting | 136—86 |
| 3,436,272 | 4/1969 | Gelting | 136—86 |

ALLEN B. CURTIS, Primary Examiner

U.S. Cl. X.R.

29—191.4